(12) United States Patent
Nakamura

(10) Patent No.: US 7,011,591 B2
(45) Date of Patent: Mar. 14, 2006

(54) BELT-DRIVE SYSTEM DRIVEN BY INTERNAL COMBUSTION ENGINE MOUNTED ON AUTOMOTIVE VEHICLE

(75) Inventor: Shigenobu Nakamura, Anjo (JP)

(73) Assignee: Denso Corporation, Kariya (JP)

(*) Notice: Subject to any disclaimer, the term of this patent is extended or adjusted under 35 U.S.C. 154(b) by 264 days.

(21) Appl. No.: 10/648,389

(22) Filed: Aug. 27, 2003

(65) Prior Publication Data

US 2004/0067803 A1    Apr. 8, 2004

(30) Foreign Application Priority Data

Oct. 4, 2002 (JP) ............................. 2002-292266

(51) Int. Cl.
*F16H 63/28* (2006.01)
*H02K 7/18* (2006.01)
*F02N 11/04* (2006.01)

(52) U.S. Cl. .................. 474/70; 474/101; 290/4 C; 322/9

(58) Field of Classification Search ........ 474/134–135, 474/112, 109; 123/90.23, 179.25, 185.5; 320/15–17; 322/22, 90; 290/4, 46
See application file for complete search history.

(56) References Cited

U.S. PATENT DOCUMENTS

| 4,725,259 | A |   | 2/1988 | Miyata |
| 5,780,731 | A | * | 7/1998 | Matsui et al. ............... 701/101 |
| 6,201,310 | B1 | * | 3/2001 | Adachi et al. ................. 322/7 |
| 6,397,808 | B1 | * | 6/2002 | Tanaka et al. ......... 123/179.25 |
| 6,857,978 | B1 | * | 2/2005 | Polster et al. ............... 474/135 |

FOREIGN PATENT DOCUMENTS

| DE |   | 19604182 A1 | * | 9/1996 |   |
| JP |   | 55-53152 A  | * | 4/1980 | ................. 310/113 |
| JP |   | 57-140525 A | * | 8/1982 | .................... 123/3 |
| JP |   | 07-149167 A | * | 6/1995 |   |
| JP |   | 2001-107827 A | * | 4/2001 |   |
| JP |   | 2001-309574 |   | 11/2001 |   |

* cited by examiner

*Primary Examiner*—Marcus Charles
(74) *Attorney, Agent, or Firm*—Oliff & Berridge, PLC

(57) ABSTRACT

A generator for alleviating fluctuations in instantaneous rotational speed of an internal combustion engine is included in a belt-drive system. When an average rotational speed of the generator is lower than a predetermined speed, for example, an idling speed, a generation torque of the generator is controlled to reduce the belt tension fluctuations. When the average speed of the generator is higher than the predetermined speed, the generator is controlled in a usual manner to supply a stable power to the electric loads.

8 Claims, 6 Drawing Sheets

BELT-DRIVE SYSTEM DRIVEN BY INTERNAL COMBUSTION ENGINE MOUNTED ON AUTOMOTIVE VEHICLE

CROSS-REFERENCE TO RELATED APPLICATION

This application is based upon and claims benefit of priority of Japanese Patent Application No. 2002-292266 filed on Oct. 4, 2002, the content of which is incorporated herein by reference.

BACKGROUND OF THE INVENTION

1. Field of the Invention

The present invention relates to a belt-drive system for driving auxiliary devices mounted on an automotive vehicle.

2. Description of Related Art

In a recent automotive vehicle, a space available for an engine compartment is getting smaller in order to secure a sufficient space for a passenger compartment. To minimize a space occupied by a belt-drive system for driving various auxiliary devices including a generator, a so-called serpentine belt-drive system that drives all the auxiliary devices with a single belt is becoming popular. An example of such a serpentine belt-drive system is shown in FIG. 7. A single driving belt 31 is wound around a crankshaft pulley 40 connected to an internal combustion engine and all other pulleys to be driven by the engine. A pulley 20a is for driving a generator 2a, a pulley 50 for a water pump, and a pulley 60 for a compressor of an air-conditioner. A pulley 30 of an automatic belt-tensioner 3 controls a tension of the driving belt 31. All the pulleys connected to respective auxiliary devices are driven by the engine through a single driving belt.

A generator is required to output a higher power to cover increasing electric loads for comfort and safety of passengers. Accordingly, it is unavoidable to increase a size of the generator and its rotor. As the rotor size increases, an inertia moment of the rotor also increases. In some cases, it is required to supply a high power to heat-generating loads such as a heated windshield or a sheet-heater. It has been proposed to use a 42-volt system instead of a conventional 14-volt system for supplying high power to such heat-generating loads.

On the other hand, there is a tendency to set an idling speed of an engine to a lower level to cope with exhaust gas problems. Further, in case of a diesel engine, a common rail system, in which a pressure in a combustion chamber is considerably increased for decreasing pollutants in exhaust gas, is getting popular in the market.

A driving torque of the crankshaft pulley fluctuates in a pulsating manner according to strokes of the engine, i.e., in synchronism with an explosion frequency of the engine. Therefore, an instantaneous rotational speed of the crankshaft fluctuates. Especially, during an engine idling period in which the driving torque of the engine is small and unstable, the engine speed fluctuation is larger than that of other situations. When the idling speed is further lowered to cope with the exhaust gas problems, the rotational speed of the engine becomes further unstable, and the fluctuations in the rotational speed of the crankshaft pulley increase.

The auxiliary devices driven by the crankshaft pulley have respective inertia moments. Therefore, the rotational speed of each auxiliary device cannot instantaneously follow the fluctuations in the rotational speed of the crankshaft pulley. The tension of the driving belt becomes high when the driving belt is pulled by the crankshaft pulley according to its instantaneously increasing rotational speed. On the other hand, the tension of the driving belt becomes low when the rotational speed of the crankshaft pulley instantaneously decreases. The phenomenon mentioned above occurs at an upstream side of the driving belt with respect to the crankshaft pulley. An opposite phenomenon occurs at an downstream side of the driving belt. In short, the driving belt becomes repeatedly loose and tight according to the fluctuations in the rotational speed of the crankshaft pulley. The larger the rotational speed fluctuation becomes, the larger the belt tension fluctuation becomes.

The belt tension fluctuation is highly affected by the generator than by other auxiliary devices, because the rotor of the generator has a large inertia moment and a high pulley ratio. Therefore, a large fluctuation in the inertia toque (the inertia torque is a product of the inertia moment and acceleration or deceleration in the rotational speed) is involved in the generator. As the belt tension fluctuation becomes large, the belt is repeatedly loosened and tightened in a higher amount. This causes slippage between the belt and the pulleys, and a durability life of the belt is shortened.

In addition, when the fluctuation in the belt tension becomes large, the automatic belt-tensioner used in a serpentine belt-drive system widely swings to maintain the belt tension constant. The belt-tensioner may interfere with other devices, thereby generating noises and causing damages in the belt-tensioner and/or other devices. Especially, in the case where the belt-drive system is driven by a diesel engine, the fluctuations in its rotational speed tend to become larger because the pressure in the combustion chamber becomes higher as mentioned above. Therefore, the above problems are further serious for the diesel engine.

To cope with these problems, JP-B2-7-72585 proposes to use a one-way clutch in a pulley of a generator. Driving torque transmission between the crankshaft pulley and the generator is interrupted by the one-way clutch when the rotational speed of the crankshaft pulley is decreasing. When the rotational speed of the crankshaft pulley is increasing, the generator pulley is not coupled to the rotor of the generator until the generator pulley speed becomes equal to that of the rotor. Thus, the inertia torque of the rotor is prevented from being transmitted to the generator pulley by the one-way clutch, and the fluctuations in the belt tension are alleviated.

In the one-way clutch shown in JP-B2-7-72585, the torque transmission or interruption between the rotor and the pulley is carried out by rollers or sprags disposed in the one-way clutch. A considerable amount of mechanical stress is imposed on the rollers or the sprags in operation of the one-way clutch. On the other hand, it is required for the generator to generate a higher power at an idling speed which is lowered to improve exhaust gas. For this purpose, it is necessary to reduce the diameter of the generator pulley and to increase the pulley ratio. It is contradictory to a down-sizing requirement to make the axial length of the generator pulley longer. Therefore, the one-way clutch has to be made small in size. To make the one-way clutch small in size, it is necessary to make its components small and to reduce an amount of lubricant contained in the one-way clutch. This results in sacrificing the durability of the one-way clutch. Further, it is difficult to enlarge the size of the generator because the engine compartment space is limited.

JP-A-2001-309574 proposes to provide an additional generator for supplying power to high voltage loads in addition to a generator for supplying power to conventional voltage loads. It also proposes to provide a circuit for exchanging power between two systems operating under different voltages. Though JP-A-2001-309574 shows an idea to use two generators, nothing about using those generators for reducing the fluctuations in the belt-tension is mentioned or shown.

SUMMARY OF THE INVENTION

The present invention has been made in view of the above-mentioned problems, and an object of the present invention is to provide an improved belt-drive system, in which the fluctuations in the belt tension are reduced without using a one-way clutch. Another object of the present invention is to provide a power-generating system that includes a high voltage power supply system.

Plural on-board devices, such as a generator, a water pump and a compressor for an air-conditioner, are driven by an internal combustion engine mounted on a vehicle. A single belt is wound around a driving pulley connected to a crankshaft of the engine and pulleys for respective on-board devices. A pulley for an automatic belt-tensioner for maintaining the belt tension constant is also included in this belt-drive system that is often referred to as a serpentine belt-drive system.

Instantaneous rotational speed of an internal combustion engine fluctuates according to respective strokes of the engine. Fluctuations in the belt tension occur in accordance with the fluctuations in the rotational speed of the engine. The fluctuations are especially large when the engine operation is unstable at a low speed. If the fluctuations in the belt tension are large, the belt would be damaged and undesirable noise would be generated. In order to suppress the fluctuations in the belt tension, a conventional generator in the belt-drive system is divided into two generators, a first generator for suppressing the belt tension fluctuations and supplying electric power to high voltage loads and a second generator for supplying electric power to normal loads.

Under a condition where an average rotational speed $\omega_a$ of a rotor of the first generator is lower than a predetermined rotational speed $\omega_0$ (for example, an idling speed), a generation torque of the first generator is controlled. That is, when an instantaneous rotational speed $\omega$ of the rotor is higher than its average speed $\omega_a$, a large amount of current is supplied to a field coil of the rotor to thereby generate a large generation torque. The generation torque suppresses increase in the rotational speed of the engine. On the other hand, when the instantaneous rotational speed $\omega$ is lower than the average rotational speed $\omega_a$, the field current is circulated in a closed circuit to quickly attenuate the amount of the field current and to thereby suppress decrease in the rotational speed of the engine. Thus, the fluctuations in the rotational speed of the engine are suppressed, and thereby the fluctuations in the belt tension are reduced. Under a condition where the average rotational speed $\omega_a$ is higher than the predetermined speed $\omega_0$, the first generator is controlled in a usual manner for supplying electric power to the loads.

Preferably, the first generator is positioned in the belt-drive system at a position closer to the belt-tensioner pulley than the second generator is positioned. In this manner, the fluctuations in the belt tension are more effectively reduced. An amount of swing in the belt-tensioner may be detected, and the generation torque of the first generator may be controlled when the amount of swing exceeds a predetermined level.

According to the present invention, the belt tension fluctuations in the belt-drive system can be surely suppressed. Other objects and features of the present invention will become more readily apparent from a better understanding of the preferred embodiment described below with reference to the following drawings.

DETAILED DESCRIPTION OF THE PREFERRED EMBODIMENT

Figure 1:
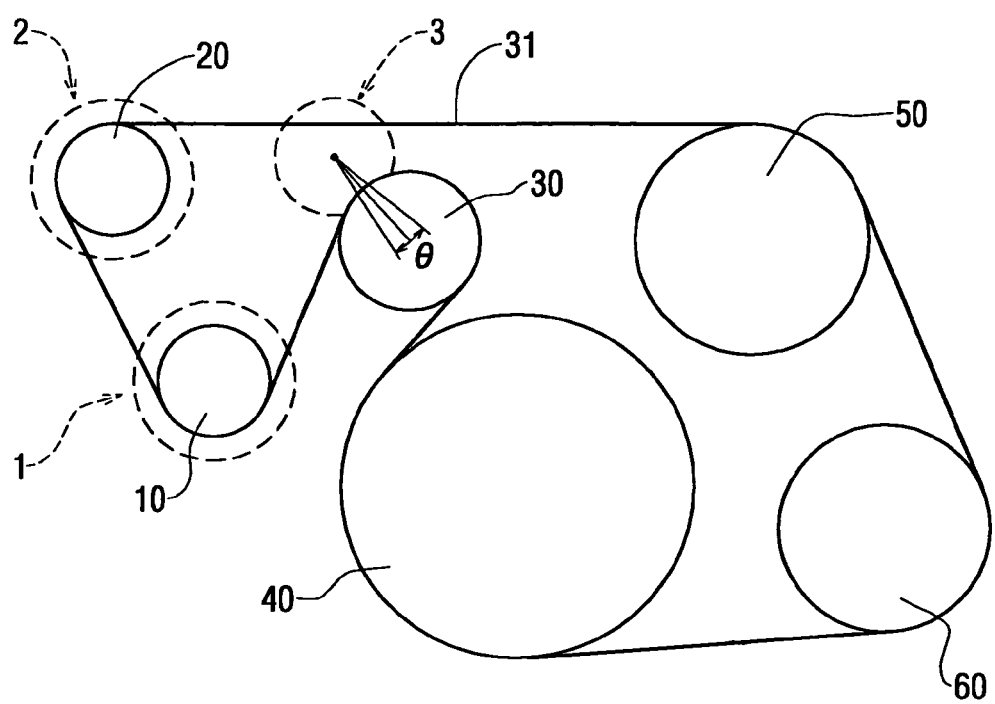
FIG. 1 is a schematic view showing a belt-drive system as an embodiment of the present invention.
Figure 7:
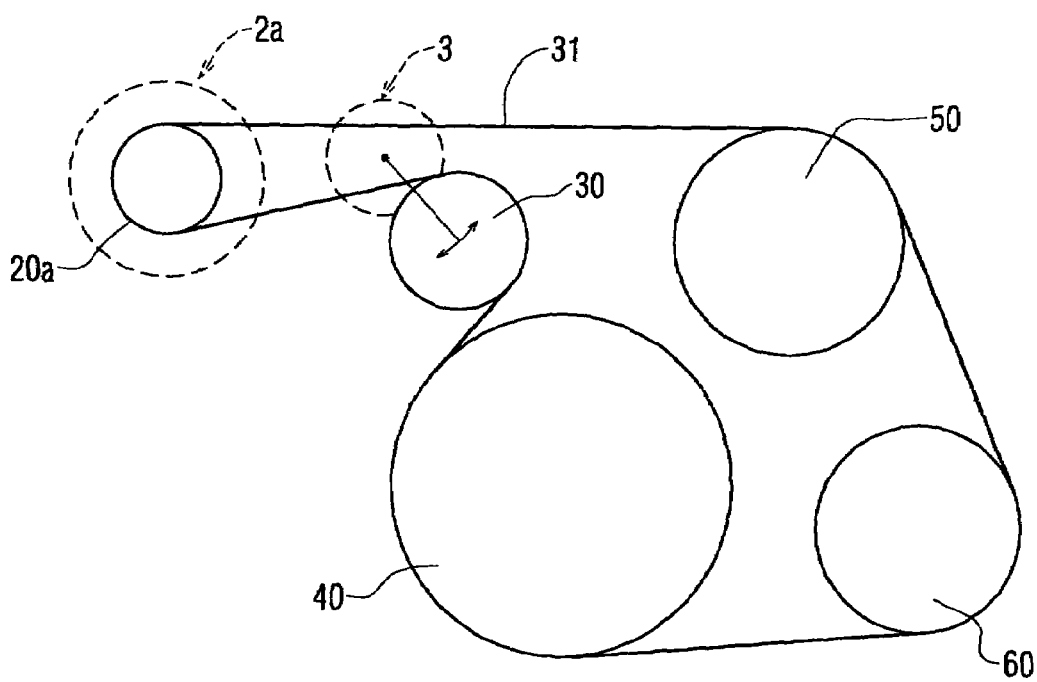
FIG. 7 is a schematic view showing a conventional belt-drive system.

A preferred embodiment of the present invention will be described with reference to FIGS. 1–4. FIG. 1 shows a belt-drive system according to the present invention. In a conventional belt-drive system shown in FIG. 7, only one generator 2a is included in the system. In the belt-drive system shown in FIG. 1, two generators, i.e., a first generator 1 and a second generator 2 are included in the system.

A pulley 10 connected to a first generator 1, a pulley 20 connected to a second generator 2, a pulley 50 for a water cooler and a pulley 60 for a compressor of an air-conditioner are all driven by a crankshaft pulley 40 connected to an internal combustion engine through a single belt 31 wound around all the pulleys. A pulley 30 of an automatic belt tensioner 3 is also disposed in the belt-drive system for maintaining the belt tension constant.

The first generator 1 supplies electric power to a 42-volt system including a battery, while the second generator 2 supplies power to a conventional 14-volt system including a battery. Since a required amount of power is generated by two generators, a size of each generator is small compared with a conventional generator 2a shown in FIG. 7. Therefore, an inertia moment of a rotor of each generator is also small compared with that of the conventional generator. Since the first and the second generators are small in size and light in weight, they are easily mounted on an engine block.

Figure 2:
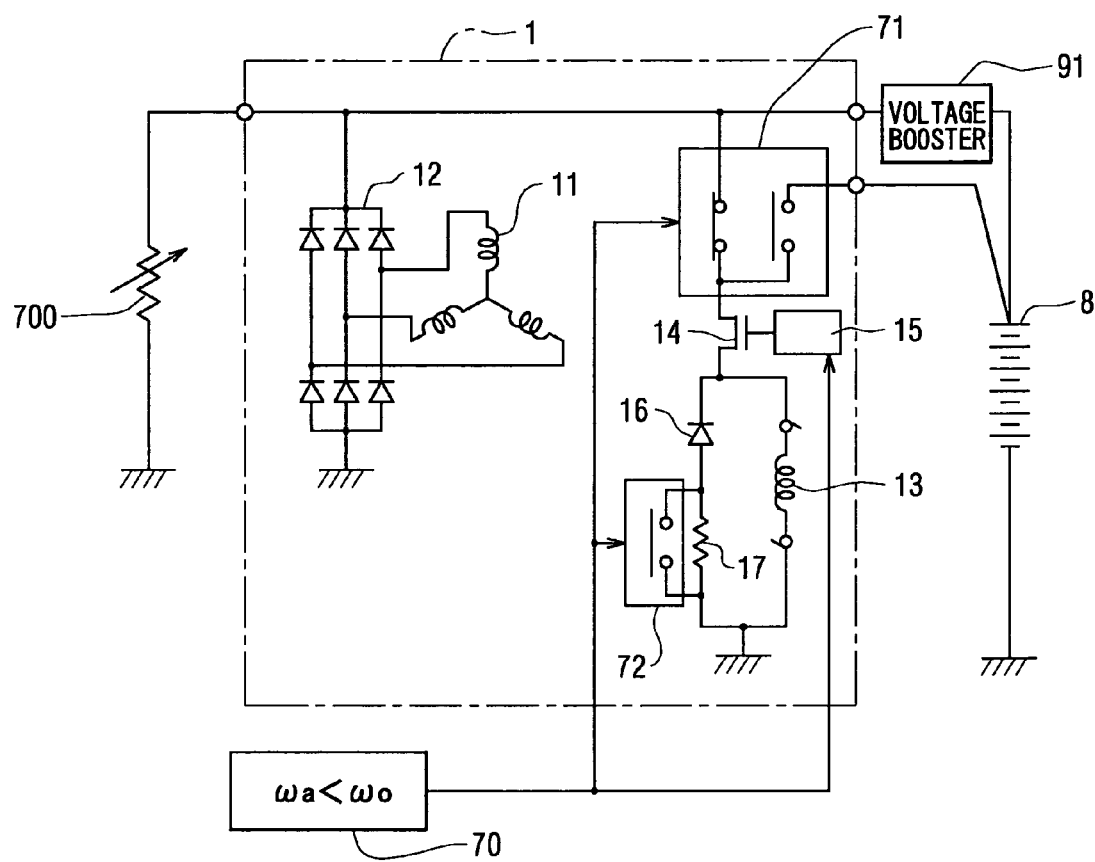
FIG. 2 is a block diagram showing a generator circuit in which a generation torque is being controlled.

The structure of the first generator 1 will be described with reference to FIG. 2. The first generator 1 is mainly composed of: armature coils 11; a rectifier 12 for rectifying alternating current generated in the armature coils 11 into direct current; a field coil 13 for supplying magnetic flux to the armature coils 11; a power transistor 14 for controlling excitation current supplied to the field coil 13; and a controller 15 for controlling switching operation of the power transistor 14. A circuit having a diode 16 and a resistor 17 connected in series is connected to the field coil 13 in parallel. A second relay 72 is connected in parallel to the resistor 17. A first relay 71 is connected between a 42-volt system battery 8 and the power transistor 14. A voltage booster 91 connected to the battery 8 boosts the voltage of the battery 8 to a higher level. The first relay 71 selectively supplies the voltage of the battery 8 or the voltage boosted by the voltage booster 91 to the field coil 13 through the power transistor 14.

Figure 4:
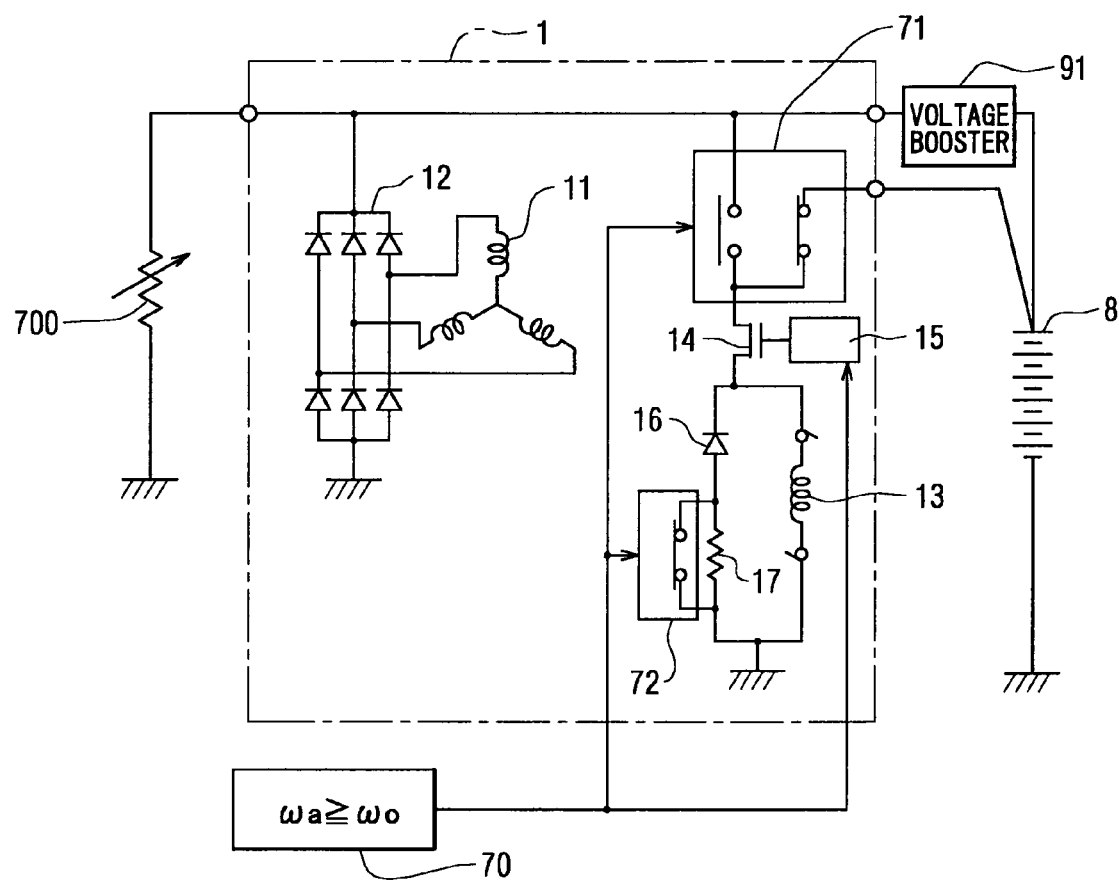
FIG. 4 is a block diagram showing a generator circuit in which a normal control is being carried out.
Figure 5:
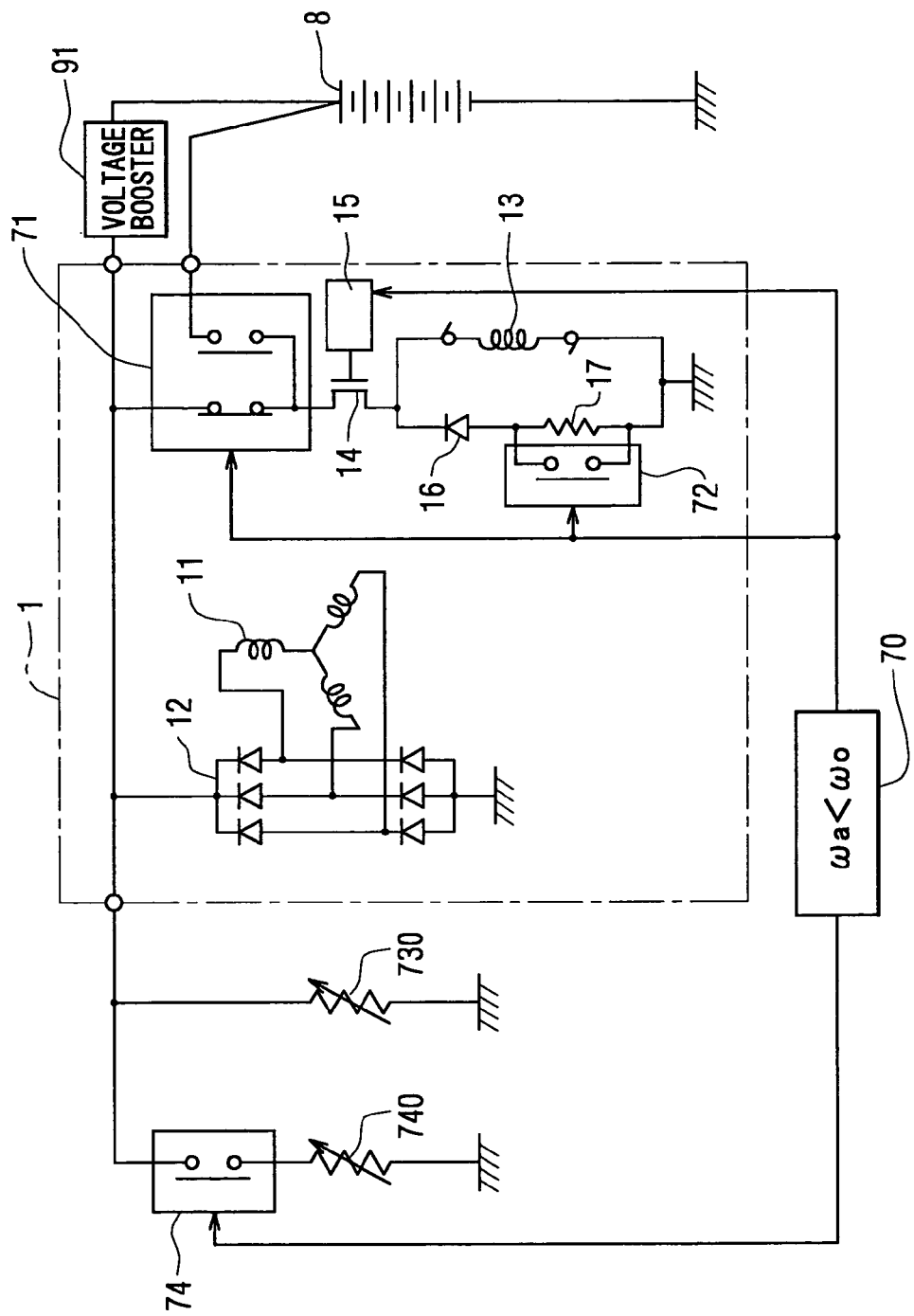
FIG. 5 is a block diagram showing a generator circuit including a relay for switching loads.

Electric loads 700 in the 42-volt system connected to an output line of the generator 1 include loads requiring a high power, such as a seat-heater, a heated windshield, an electric power steering system, an electromagnetic valve, or the like. A switching device 70 sends switching signals to the controller 15, the first relay 71 and the second relay 72 in response to a rotational speed of the engine. The switching device 70 calculates an average rotational speed $\omega_a$ of the rotor from its instantaneous speed $\omega$. The average speed $\omega_a$ is compared with a predetermined rotational speed $\omega_0$. If the average speed $\omega_a$ is lower than the predetermined speed $\omega_0$, the generator circuit is brought to a state as shown in FIG. 2. If the average speed $\omega_a$ is equal to or higher than the predetermined speed $\omega_0$, the generator circuit is brought to a state as shown in FIG. 4.

The predetermined speed $\omega_0$ is set to a speed corresponding to an idling speed of the engine, for example. When the average speed $\omega_a$ is lower than the predetermined speed $\omega_0$, the rotation of the engine is not sufficiently stable, and the fluctuation in the rotational speed is high. Under this situation, operation of the first generator 1 is controlled so that the inertia torque of the rotor is reduced. As shown in FIG. 2, the voltage boosted by the voltage booster 91 is supplied to the power transistor 14 through the first relay 71. At the same time the second relay 72 is opened to thereby connect the resistor 17 to the diode 16 in series.

Figure 3:
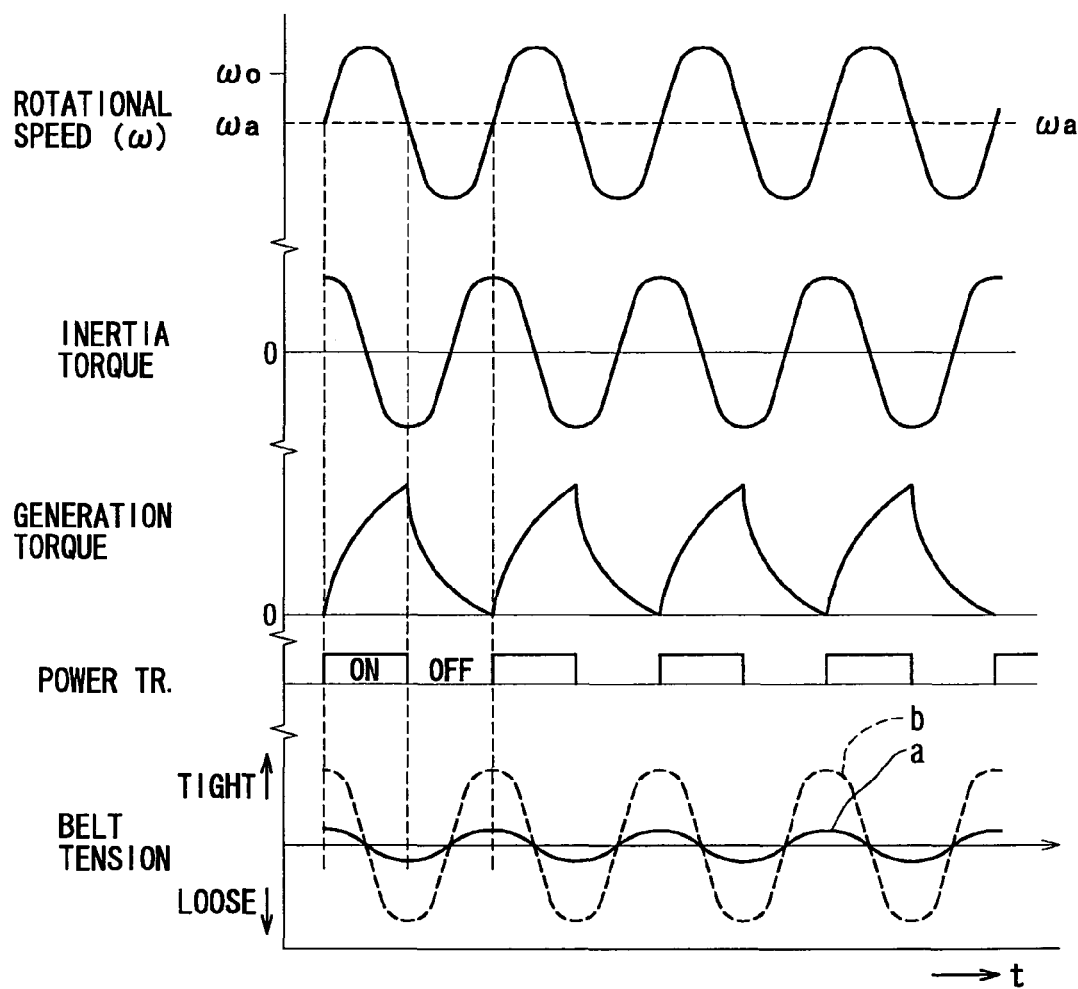
FIG. 3 shows various graphs for explaining a process of controlling the generation torque.

The power transistor 14 is controlled by the controller 15 according to the instantaneous rotational speed $\omega$, as shown in FIG. 3. That is, the power transistor 14 is turned on when the instantaneous speed $\omega$ is higher than the average speed $\omega_a$, and the power transistor 14 is turned off when $\omega$ is lower than $\omega_a$. Upon turning on the power transistor 14, the boosted voltage (a voltage higher than 42 volts) is imposed on the field coil 13. Therefore, the power generation in the first generator rises up quickly. Upon turning off the transistor 14, the field coil current flows through the closed circuit including the diode 16 and the resistor 17. Therefore, the power generation in the first generator 1 is attenuated more quickly, compared with a case where the resistor 17 is not connected in the closed circuit.

The inertia torque of the rotor varies in response to the fluctuations in the instantaneous rotational speed $\omega$, as shown in FIG. 3. The generation torque is controlled to cancel the fluctuations in the inertia torque by turning on or off the power transistor 14. The fluctuations in the belt tension (shown by a dotted line "b") that appear when the generation torque is not controlled are lowered to a line shown by "a" by controlling the generation torque.

Since the amount of required power is generated by two generators, i.e., the first generator 1 and the second generator 2, the inertia moment of the rotor of the first generator 1 is much smaller, compared with an inertia moment of a rotor of a conventional generator. The inertia torque itself (a product of the inertia moment and the acceleration or deceleration in the angular rotational speed) is also small in this embodiment. Therefore, the fluctuations in the belt tension can be effectively reduced by controlling the generation torque.

When the generation torque of the first generator 1 is controlled in the manner described above, the current outputted from the first generator 1 varies. Accordingly, a terminal voltage in the 42-volt system also varies. However, electric loads which are sensitive to the terminal voltage are not included in the 42-volt system, and the electric power to those loads sensitive to the voltage is supplied from the 14-volt system. Therefore, the voltage variations in the 42-volt system due to the generation toque control do not adversely affect the electric loads.

The first generator 1 is disposed in the belt-drive system at a position closer to the belt-tensioner pulley 30 than the second generator 2, as shown in FIG. 1. In this manner, an amount of the belt-tensioner swing due to the fluctuations in the belt tension is effectively reduced.

When the average rotational speed $\omega_a$ becomes equal to or higher than the predetermined speed $\omega_0$, the alternator circuit is brought to a state shown in FIG. 4. That is, the first relay 71 is switched to supply the normal 42 volts to the field coil 13, and the second relay 72 closes both ends of the resistor 17 to eliminate the resistor 17 from the closed circuit including the diodes 16 and the field coil 13. The controller 15 performs a normal voltage control, and the first generator 1 is controlled as a normal generator in the 42-volt system.

The present invention is not limited to the embodiment described above, but it may be variously modified. For example, the electric loads 700 in the 42-volt system may be divided into heat-generating loads 730 such as seat-heaters and other loads 740 such as a power steering device. The loads 740 are connected to the output terminal of the first generator 1 through a load relay 74. The loads 740 are separated from the 42-volt system by opening the load relay 74 when the average rotational speed $\omega_a$ is lower than the predetermined rotational speed $\omega_0$. In this manner, the loads 740 are prevented from being affected by the voltage fluctuations due to the generation torque control. Though the heat-generating loads 730 are always connected in the 42-volt system, they are not adversely affected by the voltage fluctuations because they are not sensitive to the voltage. In this manner, the fluctuations in the belt tension are reduced by controlling the generation torque without adversely affecting the electric loads.

Figure 6:
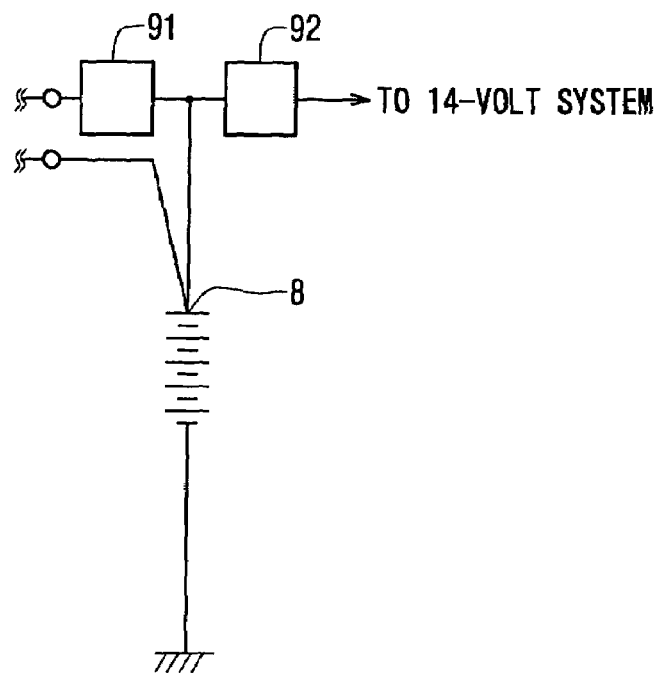
FIG. 6 is a diagram showing part of a generator circuit in which a voltage booster and a circuit for lowering voltage are provided.

Though the 14 volt-system is provided independently from the 42-volt system in the foregoing embodiment, it is also possible to connect the 14-volt system to the 42-volt system through a circuit 92 for lowering the voltage, as shown in FIG. 6. Since the generator 1 having a large capacity covering two generators is used in this arrangement, the amount of generation torque control becomes also large. Therefore, the fluctuations in the belt tension are effectively reduced by controlling the generation torque. Though the generation torque control is performed when the average rotational speed $\omega a$ is lower than the predetermined rotational speed $\omega 0$ in the foregoing embodiment, the generation torque control may be carried out in response to an amount of the belt-tensioner swing angle $\theta$. Alternatively, the generation torque may be controlled when noise in the belt-drive system is detected.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A belt-drive system driven by an internal combustion engine mounted on an automotive vehicle, the belt-drive system comprising:
   a driving pulley connected to a crankshaft of the internal combustion engine;
   a plurality of driven pulleys connected to respective on-board devices;

a belt wound around the driving pulley and the plurality of the driven pulleys so that all the driven pulleys are driven by the driving pulley, wherein:

the plurality of the driven pulleys include a pulley of an automatic belt-tensioner that controls a belt tension and pulleys of a first generator and a second generator;

the first generator is controlled to generate a generation torque that reduces fluctuations in the belt tension by controlling excitation current supplied to a field coil of the first generator; and the second generator is controlled to generate an amount of required electric power by controlling excitation current supplied to a field coil of the second generator.

2. The belt-drive system as in claim 1, wherein:

the generation torque of the first generator is controlled to reduce the fluctuations in the belt tension when an average rotational speed of a rotor of the first generator is lower than a predetermined rotational speed; and the first generator is controlled to maintain a predetermined terminal voltage when the average rotational speed is equal to or higher than the predetermined speed.

3. The belt-drive system as in claim 2, wherein:

the predetermined rotational speed is a rotational speed of the rotor of the first generator when the internal combustion engine is rotating at an idling speed.

4. The belt-drive system as in claim 2, wherein:

the pulley of the first generator is engaged with the belt at a position closer to the pulley of the belt-tensioner than the pulley of the second generator is coupled.

5. The belt-drive system as in claim 2, wherein:

the generation torque of the first generator is controlled:
by supplying the excitation current to the field coil from a voltage source having a voltage higher than a normal output voltage of the first generator when an instantaneous rotational speed of the rotor is higher than the average rotational speed thereof; and by stopping supply of the excitation current to the field coil and attenuating the excitation current by circulating it through a closed circuit including the field coil when the instantaneous rotational speed of the rotor is lower than the average rotational speed thereof.

6. The belt-drive system as in claim 5, wherein:

electric loads connected to the first generator are limited to heat-generating loads when the average rotational speed of the rotor of the first generator is lower than the predetermined rotational speed.

7. The belt-drive system as in claim 2, wherein:

the first generator supplies a higher voltage than the second generator.

8. The belt-drive system in claim 1, wherein:

the generation torque of the first generator is controlled when an amount of swing of the belt-tensioner exceeds a predetermined amount.

* * * * *